United States Patent Office 3,507,909
Patented Apr. 21, 1970

3,507,909
PRODUCTION OF SULFONATE SALTS OF LIGHTER COLOR
Jennings P. Blackwell, Bartlesville, Okla., assignor to Phillips Petroleum Company, a corporation of Delaware
No Drawing. Filed Jan. 22, 1968, Ser. No. 699,344
Int. Cl. C07b 13/02; C11d 1/14; C07c 139/04
U.S. Cl. 260—513                                     5 Claims

ABSTRACT OF THE DISCLOSURE

This invention relates to the production of substantially colorless alkanesulfonates via sulfoxidation at a temperature in the range of from 0–50° C., extracting the sulfoxidation mixture while maintaining the temperature below 50° C., neutralizing the sulfonic and sulfuric acid components of the extract while maintaining the temperature below 50° C. and finally removing the residual sulfur dioxide from the thus neutralized extract.

BACKGROUND OF THE INVENTION

This invention relates to a process for the production of substantially colorless alkanesulfonates and particularly for the preparation of these alkanesulfonates by a sulfoxidation reaction.

With the growing need for bio-degradable detergents, many processes have been proposed for their production. The well-known method of producing sulfonates, that of sulfonation by oleum, sulfuric acid, etc., although applicable to aromatic organic materials, does not produce sulfonates in high yields from saturated aliphatic hydrocarbons, and more particularly from normal alkanes which are the required starting materials for bio-degradable detergents. The production of alkanesulfonates by the reaction of alkanes with sulfur dioxide, oxygen and a sulfoxidation reaction initiator is well known in the art. However, one problem which is encountered in the production of alkanesulfonates by sulfoxidation is the dark color of the product materials formed. While the color of the product generally does not interfere with chemical reactions involving these products, customer acceptance of highly colored materials is poor and therefore, customers may refuse to utilize these products for other purposes.

Although several expedients have been proposed for producing substantially colorless alkanesulfonates, it can be safely stated that there is considerable room for improvement in this area. Prior solutions have mainly dealt with the decolorizing of the sulfonate after it has been formed. Such methods include subjecting the colored alkanesulfonate to a direct current electric field or subjecting the said sulfonates to a many-staged extraction process. Thus, the prior solutions have added more steps to an already complicated process.

It is, therefore, an object of this invention to provide an improved method for producing substantially colorless alkanesulfonates by an economically feasible process.

SUMMARY OF THE INVENTION

Therefore, according to the invention, there is provided a process for producing substantially colorless alkanesulfonates by maintaining the temperature of the alkanesulfonic acids below that temperature at which excessive color bodies are formed, prior to the formation of the corresponding alkanesulfonates and subsequent to the cessation of reaction, either by removal of said alkanesulfonic acids from the reaction medium or by stoppage of the flow of reactants.

According to one embodiment of this invention, the alkanesulfonic acids are produced via a sulfoxidation reaction, the said alkanesulfonic acids together with sulfuric acid and sulfur dioxide are extracted from the reaction medium, said sulfuric acid and alkanesulfonic acids are neutralized while maintaining the temperature below about 50° C., and the sulfur dioxide is removed from said neutralized mixture by heating said mixture.

According to another embodiment of this invention, the sulfur dioxide is removed by methods not requiring heat prior to the neutralization of the sulfonic acids.

DESCRIPTION OF PREFERRED EMBODIMENTS

The alkanes which are used according to the process of the invention are those which contain from about 5 to 24 inclusive, carbon atoms per molecule, more preferredly 10 to 18, inclusive, carbon atoms per molecule. The alkanes may be cycloalkanes, branched chain alkanes, straight chain alkanes, or alkylcycloalkanes, or mixtures thereof; however, the preferred starting materials of this invention are straight chain alkanes.

Specific examples of a few of the heretofore mentioned alkanes contemplated by this invention are: pentane, hexane, heptane, octane, decane, dodecane, pentadecane, octadecane, eicosane, tetraeicosane, 2-methylhexane, 3-ethyloctane, 2-methyl-4-ethyldodecane, 2,3-dimethylhexadecane, cyclopentane, cyclohexane, cyclooctane, cyclododecane, cyclohexadecane, methylcyclopentane, butylcyclohexane, 2,5-dimethylcyclooctane, isopropylcyclododecane, and mixtures thereof. It is understood that further specific examples are within the scope of this invention and may easily be supplied by one skilled in the art.

The basic sulfoxidation reaction involves contacting the alkanes as a liquid with sulfur dioxide, oxygen and an initiator. This initiator may be ozone, ultra-violet light, persulfuric acid, or the like. During the reaction the alkanes are in the liquid phase and sulfur dioxide gas is bubbled through said phase. A diluent can be used and is desirable when the alkanes being sulfoxidized are solid at reaction temperatures. Specific examples of these diluents are carbon tetrachloride and chloroform. The reaction may be conducted at atmospheric pressure or elevated pressures.

The sulfoxidation reaction of this invention is carried out in a temperature range from °–50° C., more preferredly about 35° C. The reaction does not proceed above the upper limit of 50° C.; however, the alkanesulfonic acid reaction mixture is known to be thermally degradable at temperatures above this. The thermal degradation causes formation of color bodies which result in an unsatisfactory product. However, it has now been discovered that the product, even after removal from the reaction zone and essentially from the hydrocarbon starting material, is still subject to discoloration by temperatures in excess of 50° C.

After completion of the reaction, the resultant liquid product is extracted with an aqueous extraction agent, such as water, aqueous methanol, aqueous ethanol, aqueous acetone, or aqueous acetonitrile to remove the alkanesulfonic and sulfuric acids from the unreacted alkanes. The extracted mixture is then contacted with a neutralizing agent to form the corresponding alkanesulfonates and sulfate. In another embodiment of this invention, the extraction step and the neutralization step can be combined. Thus, after the completion of the reaction, the resultant liquid product mixture is removed from the reaction zone and extracted and neutralized at the same time with an aqueous base. The temperature rise due to the neutralization is sometimes sufficient to discolor the product. Thus, care must be taken to maintain the temperature within the range of from 0–50° C. This may be done with either external heat exchange or by the direct addition of ice.

The neutralizing agents useful in this process are ammonia and the alkali metal and alkaline earth metal hydroxides, oxides and carbonates. In the preferred embodiment of this invention, sodium hydroxide is used.

The amount of base used should be essentially equal to, but should not exceed, that which is necessary to neutralize the sulfonic acids and sulfuric acid to their salts. Thus, approximately one equivalent of base is used for each equivalent of sulfonic and sulfuric acids present. At this stage of the process, sulfur dioxide is still present in the extracted liquid product as a dissolved gas. The sulfur dioxide should not be neutralized, in order to avoid the formation of unwanted sulfites. The amount of sulfur dioxide present is the equilibrium quantity established by the temperature and pressure, usually less than one per cent by weight.

In order to produce a product which is commercially acceptable, the residual sulfur dioxide present must be removed. Within the scope of this process two methods are available. One method which can be used is that of heating the said liquid product after extraction with a nonbasic aqueous extraction agent. Typically, the removal of the sulfur dioxide requires temperatures of about 90° C. However, as herefore mentioned, the alkanesulfonic acids thermally degrade forming color bodies above 50° C., especially in the presence of even trace quantities of sulfur dioxide. Thus, in one embodiment, the present invention requires that the removal of sulfur dioxide by heat be accomplished after the neutralization of the alkanesulfonic and sulfuric acids to their respective salts. As heretofore mentioned, said neutralization can be accomplished after extraction with said aqueous extraction agents or by extraction with an aqueous base which accomplishes both extraction and neutralization in the same step.

In another embodiment of this invention, the sulfur dioxide can be removed before neutralization if its removal is accomplished by either stripping with a gas or by the application of vacuum, while maintaining the temperature below 50° C. Since at the reaction conditions of the instant invention, sulfur dioxide is a dissolved gas, it can be quantitatively removed by either of the latter methods. Examples of gases that can be used for purging the sulfur dioxide from the mixture are air, nitrogen, helium, and other inert gases.

If required by the subsequent use of the alkanesulfonates after the above-mentioned treatments, the removal of water from the aqueous phase containing the alkanesulfonates can be accomplished by any of the well-known methods used commercially to yield a thick paste of substantially colorless alkanesulfonates.

A better understanding of the invention will be obtained upon reference to the following specific examples which are not intended, however, to be unduly limitive of the invention.

EXAMPLE I

A mixture of $C_{14}$–$C_{18}$ normal alkanes was sulfoxidized by reaction with sulfur dioxide and oxygen containing about 5 weight percent ozone. This mixture of normal alkanes was passed continuously, in the liquid phase, through the sulfoxidation reactor maintained at 35° C. Into the normal alkane mixture at atmospheric pressure were passed simultaneously a stream of sulfur dioxide and a stream of ozone-containing oxygen. The effluent from the sulfoxidation reactor was extracted with one part by weight of water per eight parts of effluent. The resultant aqueous extract contained 0.308 equivalent of $C_{14}$–$C_{18}$ alkanesulfonic acid per liter and 1.065 equivalent of sulfuric acid per liter. The aqueous extract also contained unreacted sulfur dioxide in the concentration of 1 weight percent and unreacted $C_{14}$–$C_{18}$ normal alkanes in the concentration of 19.7 weight percent. To a 250 ml. portion of the aqueous extract was added in small portions, with stirring and cooling, 13.75 grams (0.343 mol.) of sodium hydroxide pellets, the amount theoretically required to convert the sulfuric and sulfonic acids to their sodium salts. The mixture was then heated at 80–90° C. for 1½ hours to remove the sulfur dioxide. The resulting mixture was cooled to approximately 25° C., after which the pH of the solution was adjusted to approximately 7 by the addition of a small amount of dilute aqueous sodium hydroxide. The mixture was then further extracted with pentane to remove the unreacted $C_{14}$–$C_{18}$ normal alkanes. Removal of water from the aqueous phase through the use of a stream of heated air gave as a residue a thick, almost colorless paste comprising sodium $C_{14}$–$C_{18}$ alkanesulfonates and sodium sulfate.

EXAMPLE II

A 250 ml. portion of the aqueous extract as prepared in Example I was first heated at 80° C. for 1½ hours to remove sulfur dioxide. This acidic mixture darkened considerably during this heating step. To the cooled mixture was added 13.75 grams (0.343 mol) of sodium hydroxide pellets, after which the pH of the mixture was adjusted to 7 by the addition of dilute aqueous sodium hydroxide. The mixture was then further extracted with pentane to remove the unreacted $C_{14}$–$C_{18}$ normal alkanes. Removal of water from the aqueous phase through use of a stream of heated air gave as a residue a thick, yellow paste comprising sodium $C_{14}$–$C_{18}$ alkanesulfonates and sodium sulfate.

Thus, the process of this invention as illustrated through Example I is a superior method for obtaining alkanesulfonates of minimum color.

Various modifications and alterations of this invention will become apparent to those skilled in the art from the foregoing description and appended claims without departing from the scope and spirit of this invention, and it should be understood that this invention is not to be limited unduly to that set forth herein for illustrative purposes.

I claim:
1. A process for producing substantially colorless alkanesulfonates which comprises
   (a) contacting a mixture of alkanes with a sulfoxidation agent comprising sulfur dioxide and oxygen and a sulfoxidation initiator comprising at least one of ozone, ultra-violet light, and persulfonic acid at a temperature in the range from 0–50° C.,
   (b) extracting a mixture thermally degradable above 50° C. comprising alkanesulfonic acid, sulfuric acid and sulfur dioxide from the resultant liquid product with an aqueous extraction agent selected from the group consisting of water, aqueous methanol, aqueous ethanol, aqueous acetone and aqueous acetonitrile, the temperature during said extracting being maintained at a temperature below 50° C.,
   (c) contacting the said mixture obtained in step (b) with a neutralizing agent selected from the group consisting of ammonia and the alkali metal and alkaline earth metal hydroxides, oxides and carbonates in an amount sufficient to neutralize said sulfonic and sulfuric acids while maintaining the temperature above 0° C. but below 50° C. the temperature at which color bodies are formed, and
   (d) removing residual sulfur dioxide from the thus neutralized sulfonic and sulfuric acids.
2. A process according to claim 1 wherein the alkanes of said mixture are normal alkanes having from 5 to 24, inclusive, carbon atoms, per molecule, wherein said neutralizing agent is an alkali metal base, and wherein said aqueous extraction agent is water.

3. The process according to claim 1 wherein the sulfur dioxide is removed by heating said neutralized mixture.

4. The process according to claim 1 wherein the said residual sulfur dioxide is removed by stripping said extracted mixture with a gas.

5. A process according to claim 1 wherein the said aqueous extraction agent comprises the said neutralizing agent such that the said alkane sulfonic acids and sulfuric acid are neutralized during the extraction step.

References Cited

UNITED STATES PATENTS

| 3,260,741 | 7/1966 | Mackinnon et al. | 260—513 |
| 2,290,167 | 7/1942 | Datin | 260—513 |

FOREIGN PATENTS

| 735,096 | 5/1943 | Germany. |

DANIEL D. HORWITZ, Primary Examiner